United States Patent [19]

Thomas et al.

[11] 4,205,742

[45] Jun. 3, 1980

[54] CUBING SYSTEM

[76] Inventors: Paul M. Thomas, 6303 E. Mockingbird La., Paradise Valley, Ariz. 85253; Daniel P. Abrahamson, 3030 N. 56th Dr., Phoenix, Ariz. 85031

[21] Appl. No.: 935,995

[22] Filed: Aug. 23, 1978

[51] Int. Cl.² ............... B65G 52/00; B65G 47/24
[52] U.S. Cl. ................................. 198/374; 198/419; 414/32; 414/62
[58] Field of Search ............... 198/374, 419, 434; 414/32, 34, 67, 68, 62

[56] References Cited
U.S. PATENT DOCUMENTS
3,951,283  4/1976  Lingl, Jr. .

Primary Examiner—Jeffrey V. Nase
Attorney, Agent, or Firm—Luedeka & Hodges

[57] ABSTRACT

In a system for cubing rectangular units such as block or brick, there is provided a system for reorienting selected ones of the units to formulate layers in the cube to provide maximum stabilization of the units in the cube. The apparatus includes an orientation station comprising a plurality of planar tables, selected ones of which are movable laterally in a horizontal plane, rotated to reorient units thereon, and return to their original position for offloading of the reoriented blocks.

7 Claims, 11 Drawing Figures

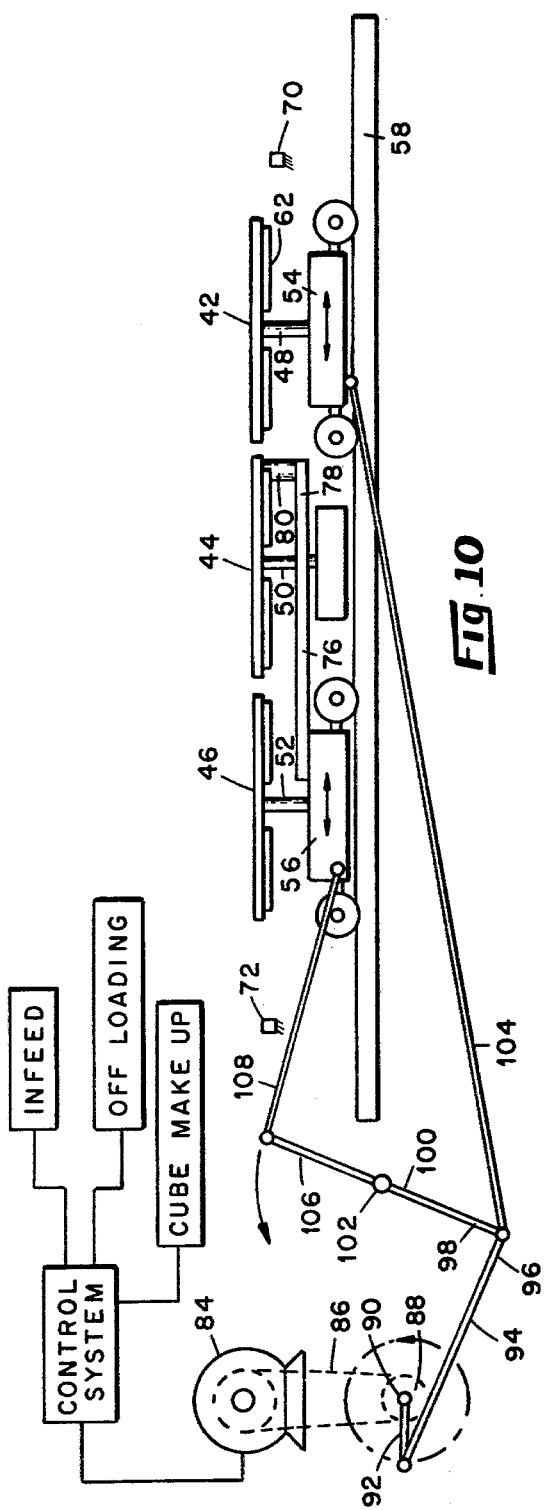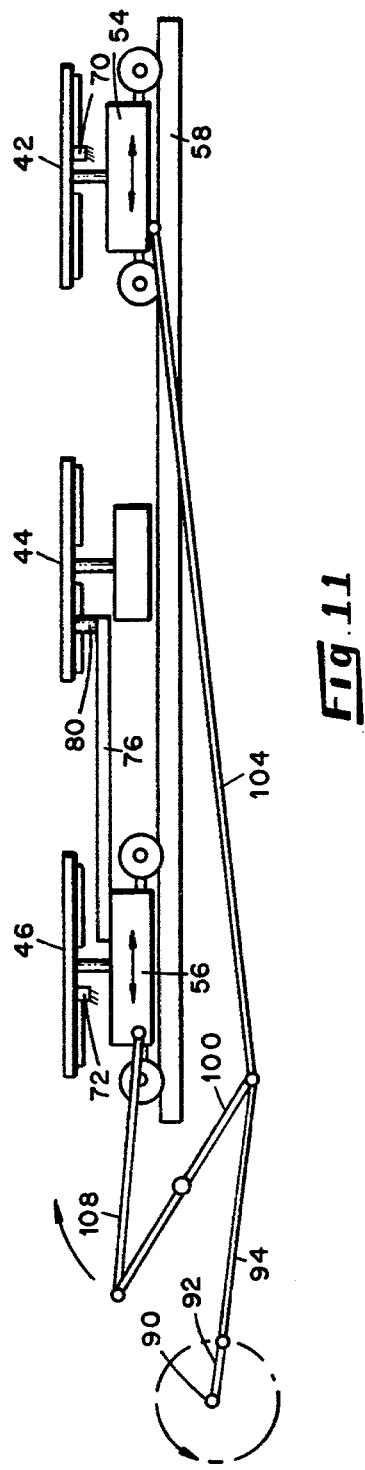
Fig.10
Fig.11

CUBING SYSTEM

This invention relates to methods and apparatus for accumulating rectangular masonry units such as block or brick or the like in cubes, and particularly to the orientation of the units for cubing.

It is customary in the building block and brick industry to receive cured block or brick from a kiln and accumulate the individual units in stacks termed "cubes". Preferably, the individual units of rectangular block or brick are stagger-stacked to develop a stronger interconnecting bond between the units in each layer and between the layers of the stack so that the cube is stabilized against dislodgement of individual units therefrom. These cubes may or may not be provided with securing bands.

One example of a cube 12 of masonry blocks is depicted in FIG. 1. In this depicted cube, ninety blocks 14, each eight inches by eight inches by sixteen inches, are oriented in six layers of fifteen blocks per layer. Only one block is shown in this Figure with the remaining blocks of the layer being depicted by parallelograms 16.

In the first layer of the depicted cube, there is provided a first course 18 comprising three blocks with their longitudinal dimensions aligned end to end. Next there is provided a course 20 of six blocks with their longitudinal dimensions parallel and with their sides in abutting relationship. The first layer is completed by a third course 22 which is identical to the second course. The blocks in the second layer are substantially identically oriented except the course comprising three blocks with their longitudinal dimensions in abutting relationship is on the opposite side of the layer as opposed to the position of this course in the first layer. When these layers are alternately laid up in the cube, the result is an interlocking of the several blocks in the cube. In this respect, it is noted that layers 1, 3 and 5 are identical and layers 2, 4 and 6 are identical, all layers being counted from the bottom up. In the usual instance, the first layer is laid on a pallet (not shown).

This example of a cube of masonry blocks is for illustration purposes only, and it will be realized that variations of the block orientation may be employed to include more or fewer blocks per cube and more or less interlocking between the blocks in the individual layers. Further, the cube may be made up of brick as opposed to masonry block or different size blocks such as the common eight inches by two inches by sixteen inches masonry block.

In accordance with the present invention, there is provided an improved method for cubing masonry units such as block or brick, each of which is of generally rectangular geometry and has a longitudinal dimension, comprising the steps of feeding a first plurality of the units to an infeed station with the respective longitudinal dimensions of the units being substantially parallel one to another, moving the units forwardly to an orientation station while maintaining the orientation of the units relative to one another, in the orientation station moving a first portion of the units along a substantially horizontal path away from the remainder of the units in the orientation station by a distance sufficient to permit rotation of the first portion of said units in a horizontal plane without contact with the remaining units of the orientation station, rotating the first and remaining portions of the units by at least ninety degrees to reorient the longitudinal dimensions of the units in each portion with respect to the longitudinal dimension of the units in the other portions, moving the first portion horizontally toward the remaining portion of the units to bring the portions in substantially abutting relationship with one another, off-loading the reoriented units from the orientation station, and accumulating the units in a cube. In a preferred embodiment, the units are divided into three portions with two portions being moved laterally away from the third remaining portion, all portions being reoriented and thereafter returned to their contiguous positions.

In the apparatus of the present invention, there is provided an infeed station, an orientation station, an off-bearing station, and a cubing station. The infeed station generally comprises an infeed table having a flat upper surface for receiving a plurality of masonry units, an apron forming a transition between the infeed station and the orientation station and means for moving the blocks from the infeed table to the orientation station.

The orientation station comprises a plurality of tables oriented in a horizontal plane and in contiguous relationship one to another. Each of the tables is mounted for rotation in a horizontal plane. In the preferred embodiment, there are three such tables, the central one of which is maintained stationary against horizontal movement, and the outboard ones of which are mounted on track means or the like for horizontal movement away from the return toward the stationary central table. Within the orientation station, there is provided means connecting the several tables one to another and in one embodiment including a crank arm with connecting links and cams such that rotation of the crank arm results in cyclical sliding motion of the outboard tables away from the stationary central table, rotation of all (or less than all) of the tables and return of the outboard tables to their contiguous positions relative to the central table.

The off-loading station includes an apron forming a transition between the orientation station and the off-loading station. It further includes means conveying the off-loaded masonry units from the orientation station to a cubing station. In a preferred embodiment, the transition aprons between the infeed station and the orientation station and between the orientation station and the off-loading station are selectively adjustable out of their respective horizontal planes to accommodate rotation of the tables in the orientation station.

The apparatus includes a control system for selective activation of the various elements of the apparatus.

It is therefore an object of this invention to provide an improved method and apparatus for the cubing of masonry units such as block or brick, each of which is of generally rectangular geometry and possesses a longitudinal dimension. It is a more specific object to provide an improved method and apparatus for reoriented selected ones of a plurality of masonry units or the like prior to accumulating such units in a cube. Other objects and advantages of this invention will be apparent from the following description including the drawings in which:

FIGS. 10 and 11 are schematics depicting the orientation tables and apparatus suitable for the movement thereof between their contiguous and extended positions.

Figure 1:
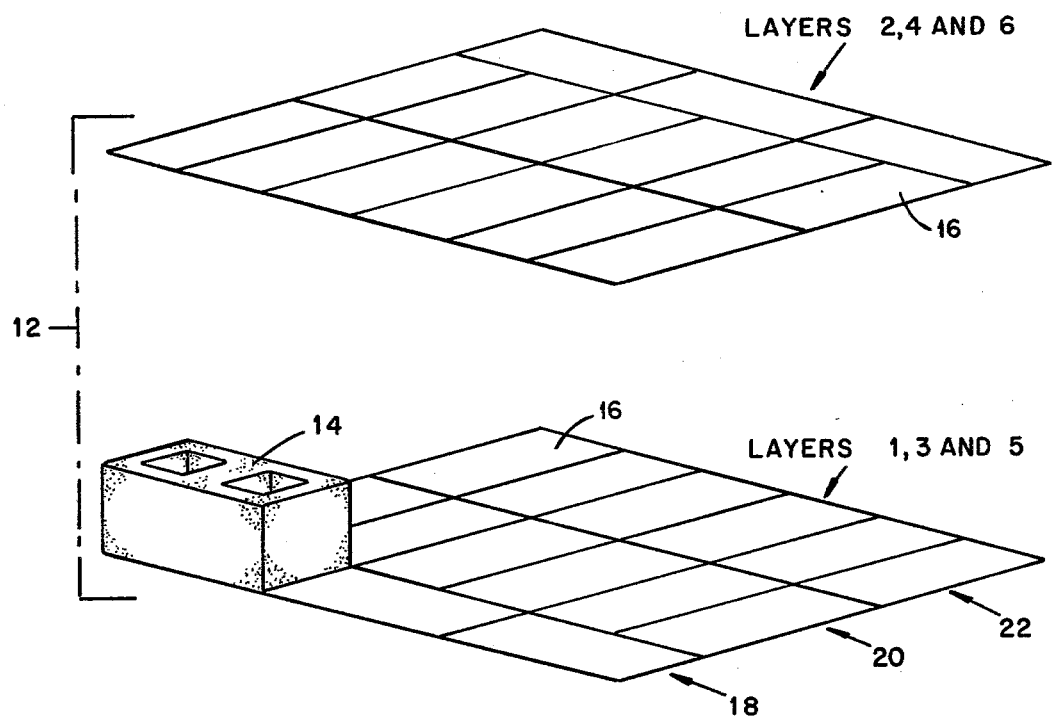
FIG. 1 is a representation of a typical cube of masonry units.
Figure 2:
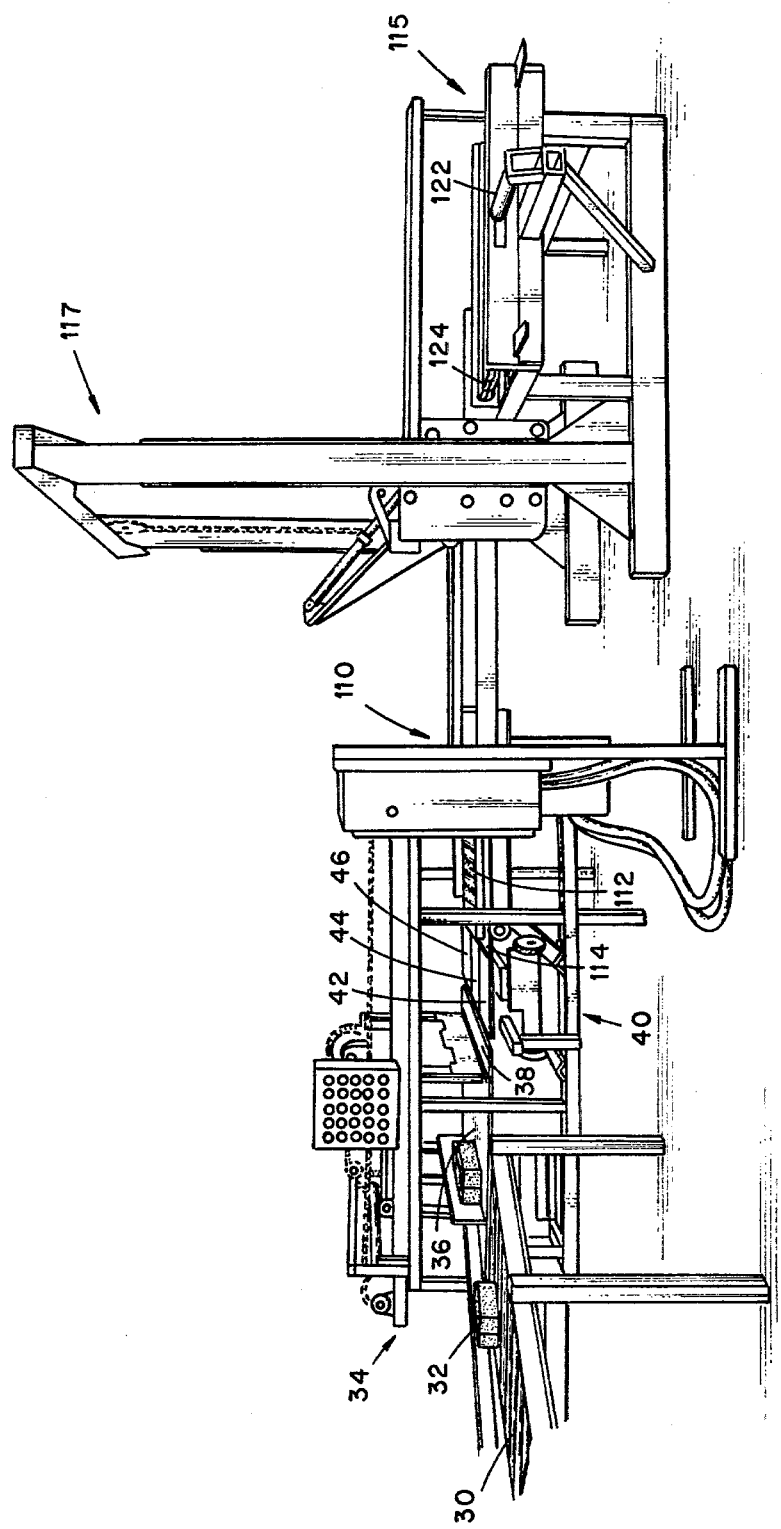
FIG. 2 is a representation of apparatus depicting various features of the invention.
Figure 3:
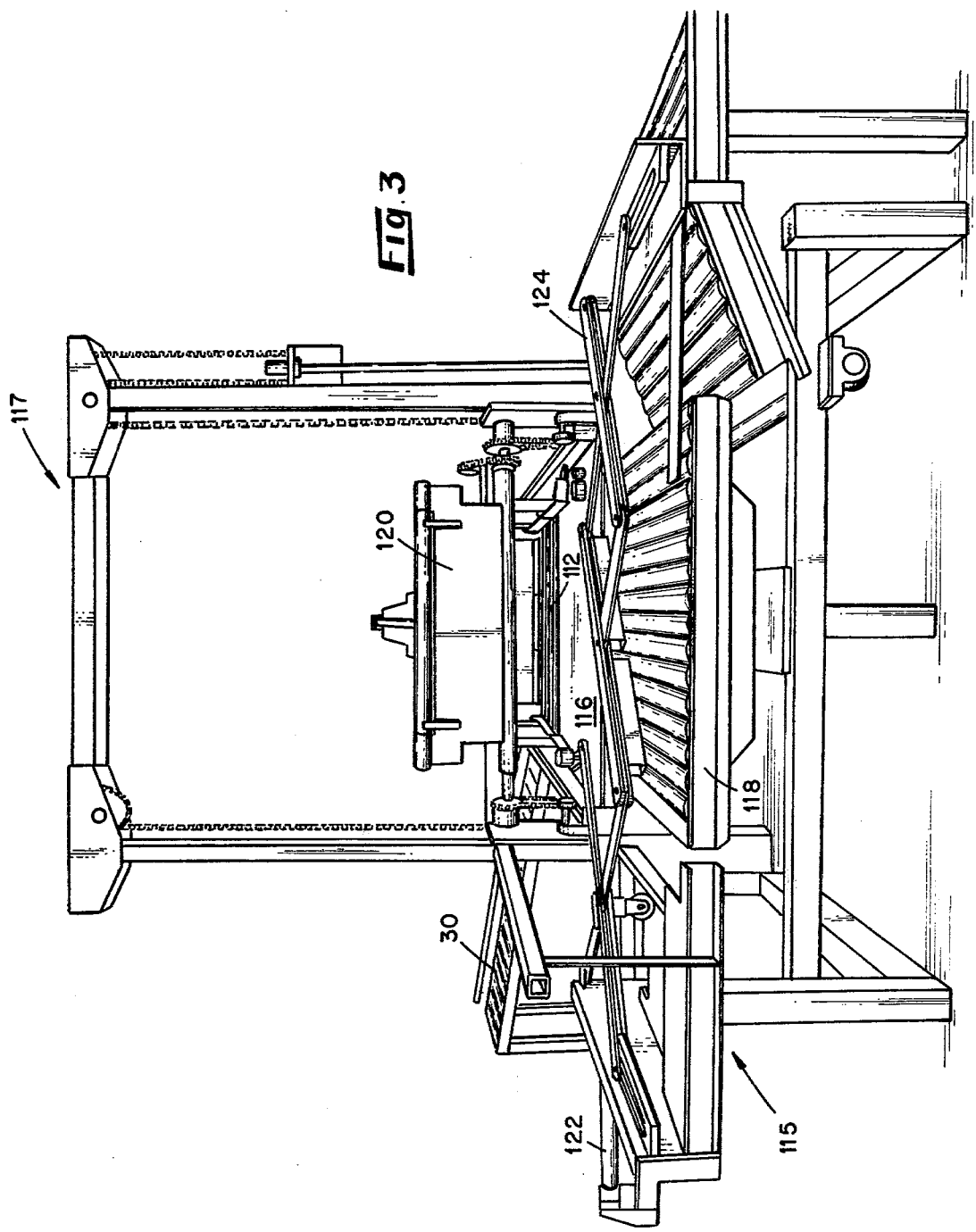
FIG. 3 is an end view of the right hand end of the apparatus as depicted in FIG. 1.
Figure 4:
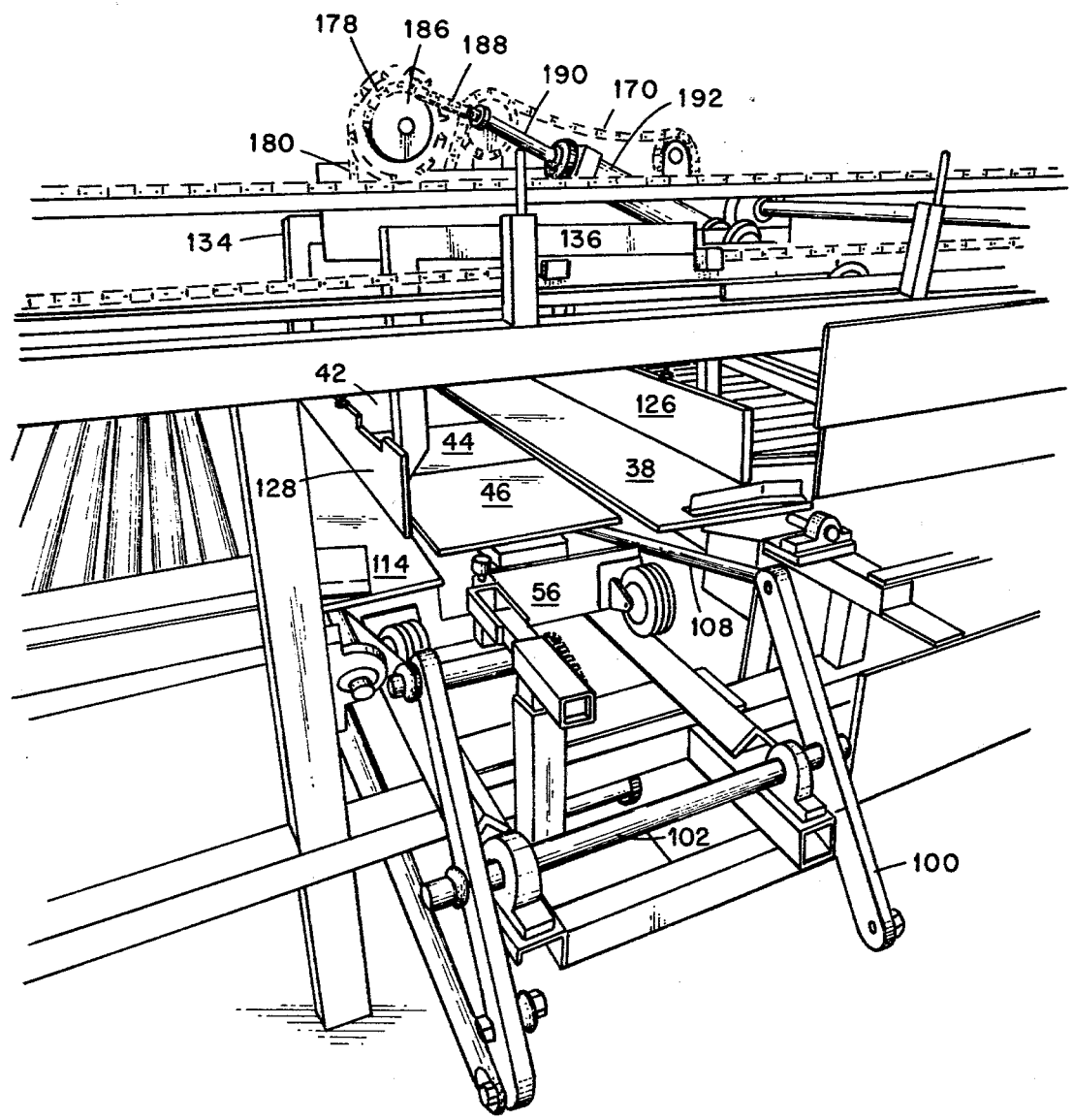
FIG. 4 is a side view, in perspective, of a central portion of the apparatus depicted in FIG. 1 and showing the orientation station of such apparatus and with the orientation tables in their contiguous positions.
Figure 5:
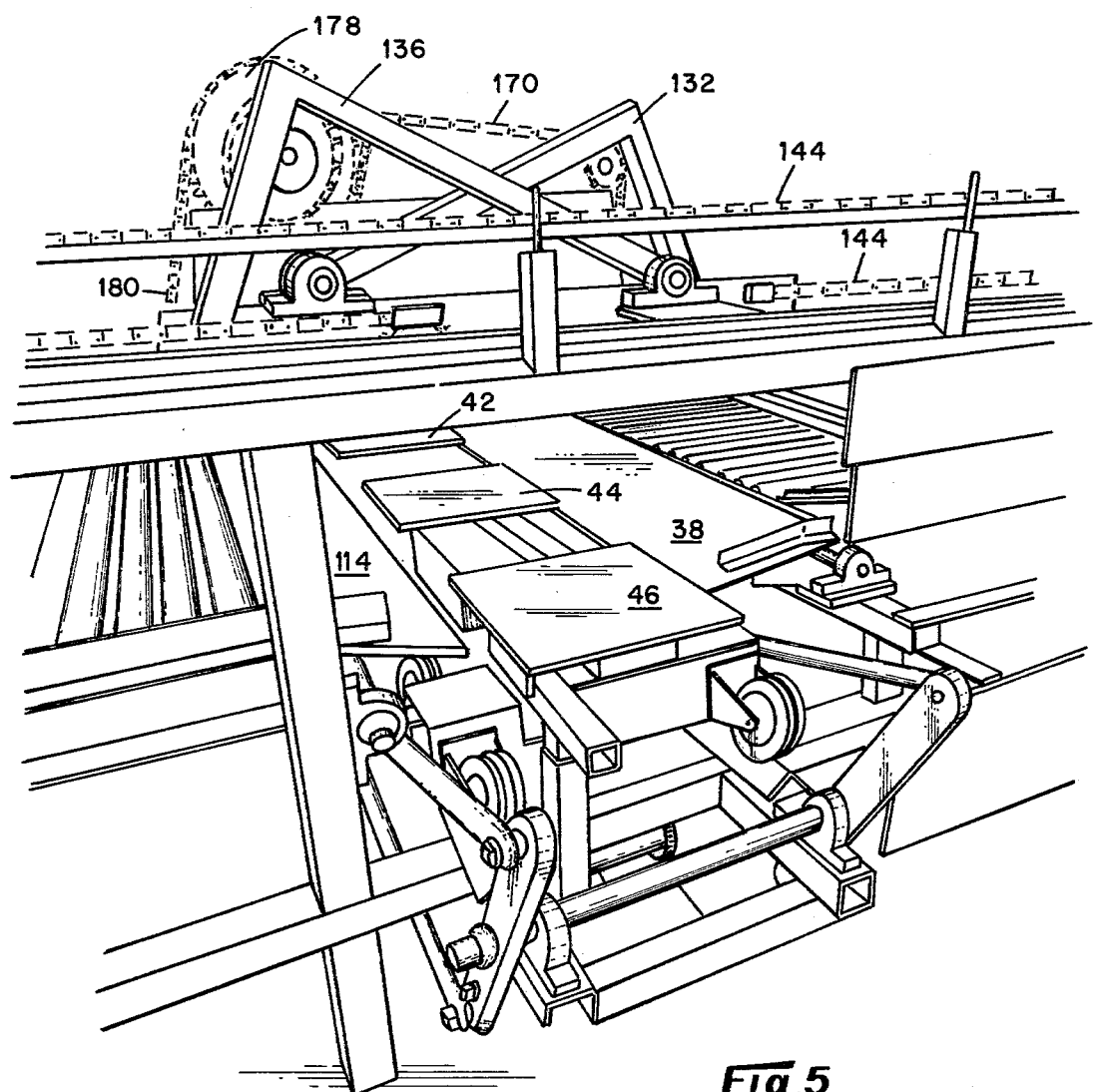
FIG. 5 depicts a portion of the apparatus shown in FIG. 4 and shows the orientation tables in their extended positions.
Figure 6:
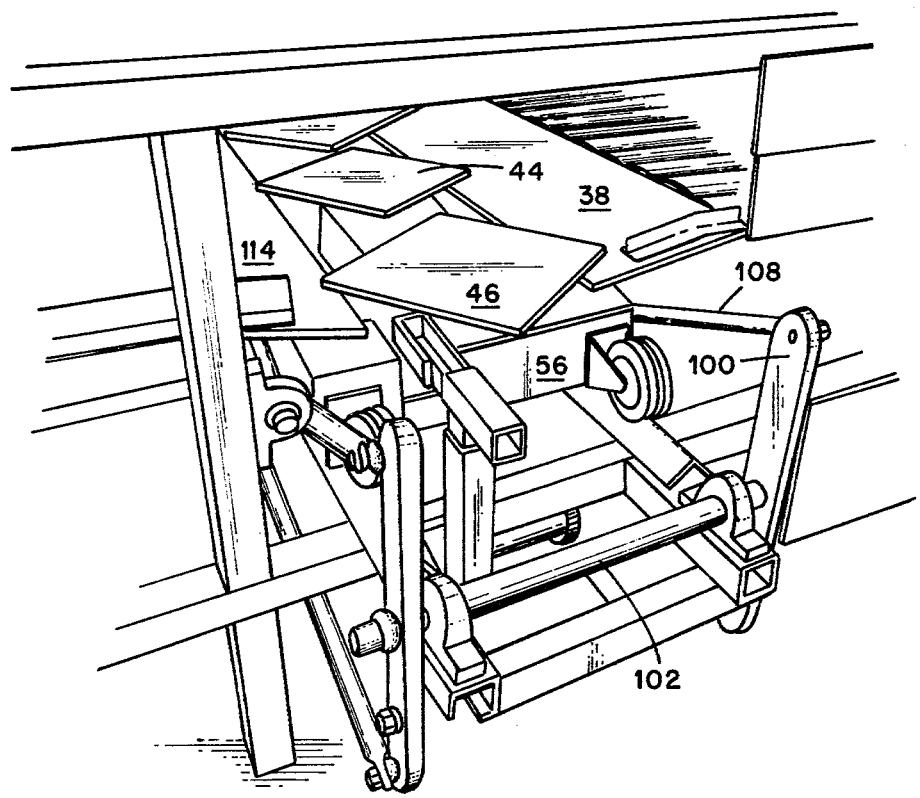
FIG. 6 depicts a portion of the apparatus shown in FIG. 4 and shows the orientation tables in their partially rotated positions.

Referring now to FIG. 2, the depicted apparatus includes an infeed conveyor 30 adapted to receive and feed a plurality of masonry blocks 32, for example, to an infeed station indicated generally at 34. It is noted that in the depicted embodiment, the incoming blocks are in pairs with their respective longitudinal dimensions parallel to one another. The incoming blocks are pushed by subsequent blocks from the conveyor onto an infeed table 36. In the depicted embodiment, the width of the infeed table is equal to about three times the length of a single block so that six blocks with their ends abutting (i.e. two rows of three blocks each) constitutes a "load" on the infeed table. When the third pair of blocks has been pushed onto the infeed table, an infrared cell or other detector (not shown) detects the presence of the load on the infeed table and stops the forward movement of the blocks to the infeed station.

The leading edge of the infeed table 36 defines an apron 38 which extends across the width of the infeed table and which is pivotally mounted to the leading edge of the infeed table.

The orientation station, indicated generally by the numeral 40, comprises, in the depicted embodiment, three square plates 42, 44 and 46, defining orientation tables suitable to receive thereon one or more, preferably two, blocks. Each of the tables is mounted in pedestal style on an upright shaft 48, 50 and 52 (FIG. 10) whose lower end is mounted in a bearing member such that each of the tables is rotatable within a horizontal plane. The outboard tables 42 and 46 are mounted on respective carriages 54 and 56 which are in turn mounted on rails 58 and 60 such that the outboard tables 42 and 46 may be moved laterally away from the central table 44 in a horizontal plane and thereafter returned to their "home" position contiguous to the central table 44. As noted, the central table 44 is rotatable but is fixed as respect horizontal movement.

Figure 9:
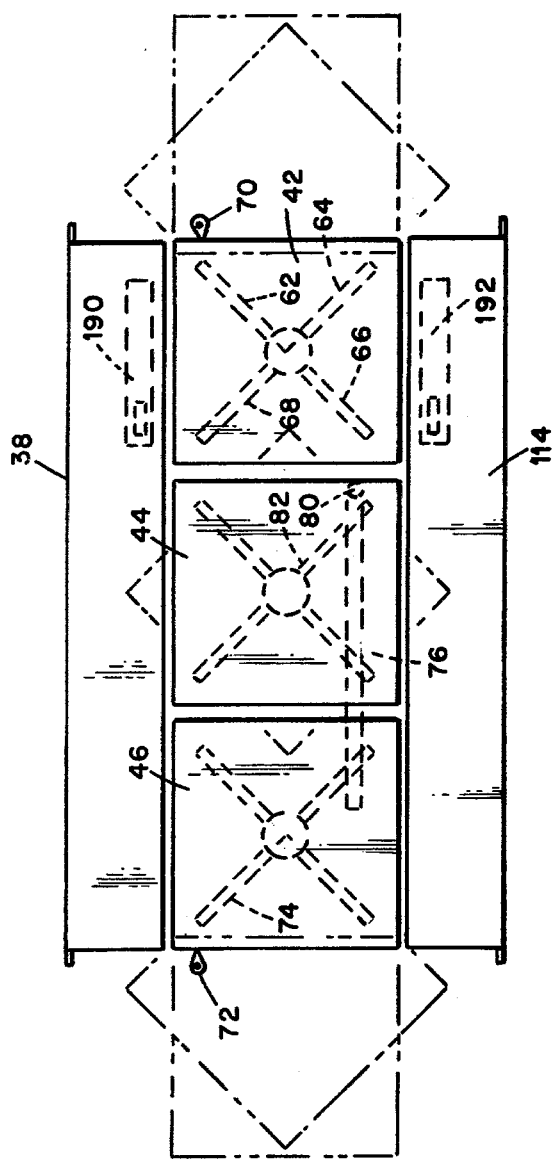
FIG. 9 is a schematic showing a top view of the orientation tables in their home position, extended positions, and partly rotated positions.

Referring specifically to FIG. 9, each of the tables has provided on its underside a plurality of shoulders 62, 64, 66 and 68, (typical) that radiate diagonally from the rotational center of the table. Below the horizontal plane of the undersides of the tables, there are provided cam members 70 and 72 positioned to engage one of the shoulders 62 and 74 of the tables 42 and 46, respectively, when these tables are moved laterally as indicated by the dotted lines in FIG. 9. It will be recognized that following engagement of the shoulder 62 of the table 42 with the cam 70, further lateral movement of the table 42 to the right as seen in FIG. 9 will result in rotational movement of the table as the cam slides along the shoulder 62. In the depicted embodiment, this rotation is ninety degrees. The contact between the cam 72 and the shoulder 74 of the table 46 likewise results in rotation of the table 46 by ninety degrees.

Referring to FIGS. 9, 10 and 11, the cart 56 is provided with an arm 76 fixedly secured thereto and which extends therefrom to the underside of the central table 44. On the outboard end 78 of this arm, there is provided a cam 80 in position to engage the shoulder to the left as viewed in FIG. 10, thereby providing for simultaneous rotation of the central table 44 with the rotation of the outboard table 46.

Lateral movement of the carriages 54 and 56 associated with the outboard tables 42 and 46 is accomplished by a crank arm system as best seen in FIGS. 10 and 11. The depicted crank arm system comprises a drive motor 84 which is drivingly connected as by a chain 86 to a sprocket 88 mounted on a shaft 90. This shaft has pinned thereto a crank arm 92 which is rotatable with the shaft in response to activation of the motor 84. The outboard end of this crank arm 92 is pivotally connected to a first connecting rod 94 whose opposite end 96 is pivotally connected to one end 98 of a further arm 100 which is pivotally mounted at its central portion 102. This first end 98 of the pivoted arm 100 has further pivotally connected thereto a connecting rod 104 which extends therefrom to be pivotally connected to the carriage 54. The opposite end 106 of the pivoted arm 100 is joined by a connecting rod 108 to the carriage 56 such that rotation of the crank arm 92 results in rotation of the further arm 100 about its central pivotal location to move the carriages reciprocally in a horizontal direction as indicated in FIGS. 10 and 11.

Referring to FIG. 2, adjacent to the orientation station 40, there is provided an off-loading station 110 comprising a conveyor 112 disposed in a horizontal plane substantially parallel to the plane occupied by the tables 42, 44 and 46. An apron 114 is disposed between the tables and the conveyor 112 and is pivotally connected to the end of the conveyor.

The apparatus further includes a cubing station 115 which is of conventional design and need not be discussed in detail. In general, the depicted cubing station comprises an elevator table 116 adapted to accumulate a layer of oriented block and thereafter be elevated, as by an elevator mechanism 117, to a predetermined height, and moved forwardly over a pivotal cubing table 118. Thereupon, a guillotine stop 120 is lowered and the elevator table is withdrawn to pull the table from under the layer of block to deposit the layer on a pallet held on the cubing table, on the cubing table itself, or on a previously deposited layer of block. The operation of the cubing station is programmed and controlled in the conventional manner. Once the appropriate number of layers has been deposited on the cubing table, the cube is pushed from the cubing table as by a piston-cylinder device 122 acting on a scissors pusher 124.

Figure 7:
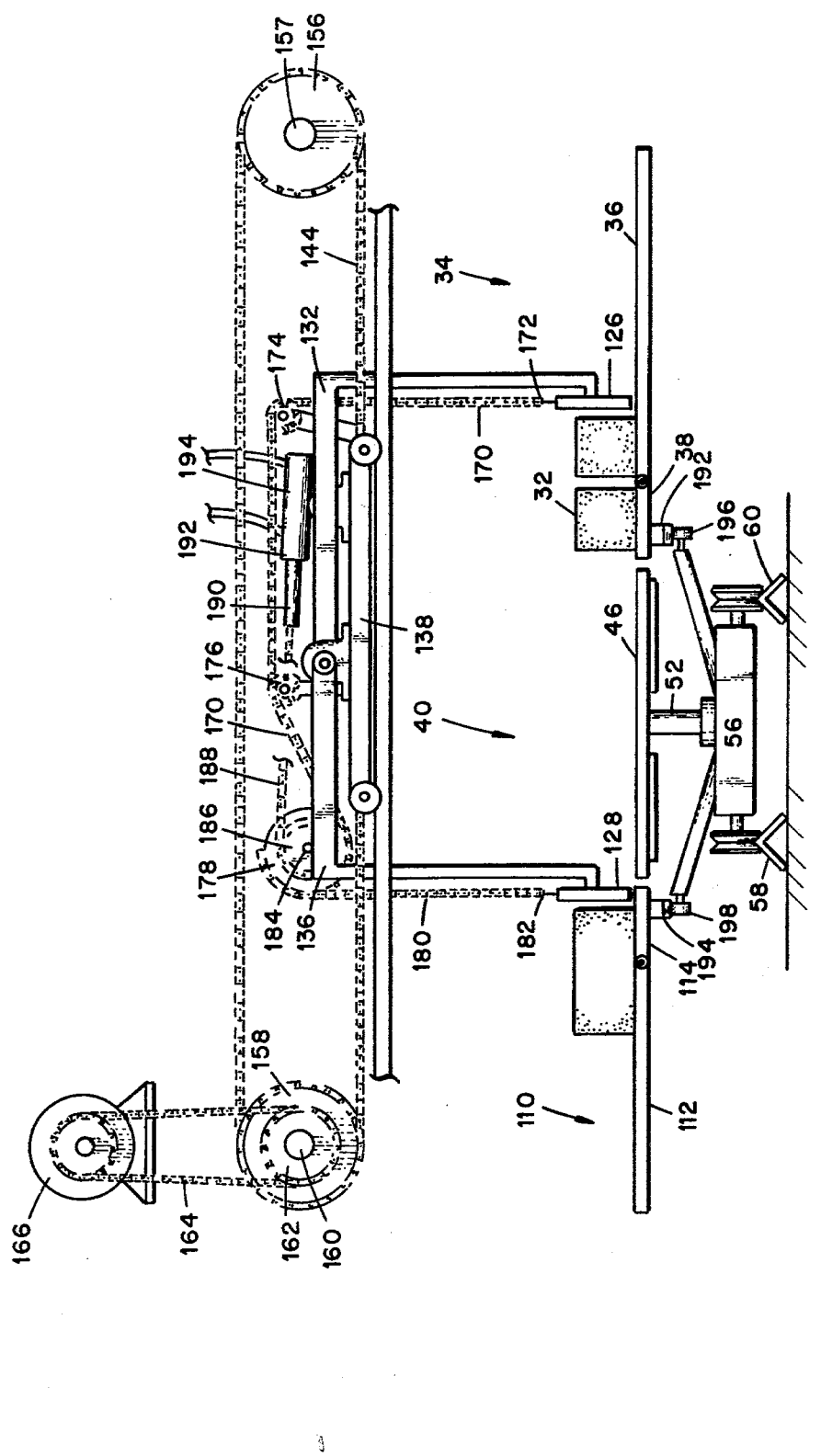
FIG. 7 is a schematic representation of a portion of the apparatus of the present invention showing the infeed, orientation and off-loading stations.
Figure 8:
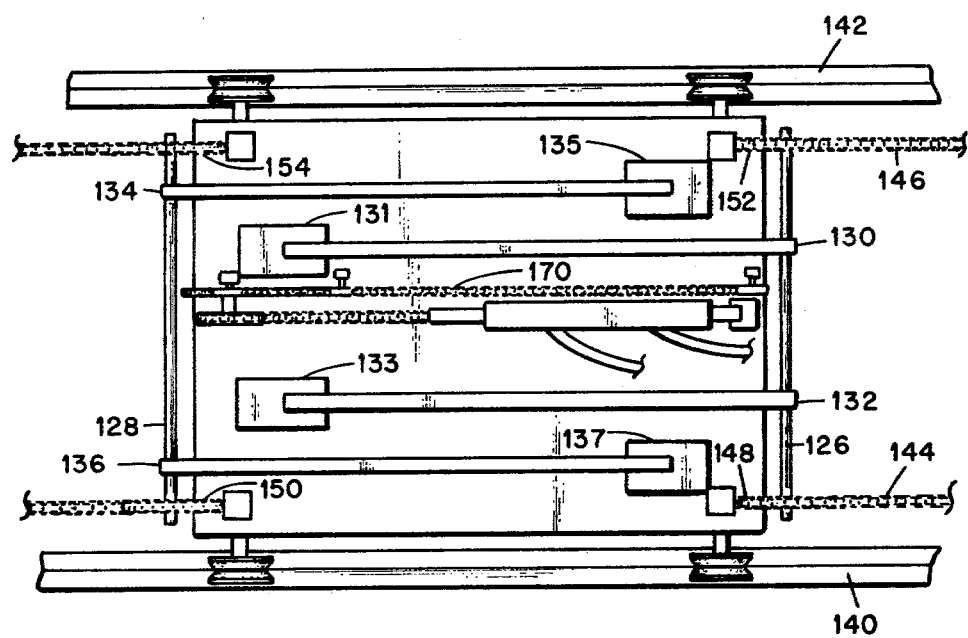
FIG. 8 is a top view schematically depicting a portion of the apparatus shown in FIG. 7.

Referring to FIG. 7, movement of the block from the infeed table 36 to the orientation station 40 and thence to the off-loading station 110 is accomplished in the depicted embodiment by means of a pair of pushers 126 and 128, each of which is mounted on a pair of arms 130 and 132, and 134 and 136, respectively, that extend upwardly from the pusher and have their respective opposite ends pivotally mounted, as by pillow blocks 131, 133, 135 and 137 to a trolley 138 mounted on rails 140 and 142 for reciprocatory movement thereof to carry the pushers along a path from the infeed station, through the orientation stations, and including the off-loading station. Such movement of the trolley 138 is accomplished by means of chains 144 and 146 whose respective opposite ends 148, 150 and 152, 154 are secured to the trolley 138.

As seen in FIG. 7, the chain 144 wraps sprockets 156 and 158, mounted on respective shafts 157 and 160 with the sprocket 158 having mounted on its shaft 160 a further sprocket 162 which is drivingly connected as by a chain 164 to a reversible motor 166, so that actuation of the motor 166 serves to move the trolley 136 reciprocatably along the rails 140 and 142.

Pivotal movement of the arms 130 and 132 to which is connected the pusher 126 is accomplished by means of a chain 170 connected at one of its ends 172 to the pusher 126 and extending therefrom about a sprocket 174 mounted on the trolley 138 thence about a further sprocket 176 also mounted on the trolley, thence into partially wrapping engagement with a still further sprocket 178. The other of the pushers 128 is similarly pivotally movable by means of a chain 180, one of whose ends 182 is secured to the pusher 128 and whose opposite end partially wraps the sprocket 178. The sprocket 178 is mounted on a shaft 184 which is further provided with a sprocket 186 about which there is wrapped one end of a chain 188 which extends therefrom to be connected to the outboard end of a piston 190 of a hydraulic piston-cylinder assembly 192, such that extension or retraction of the piston 190 within the cylinder 194 results in rotation of the sprocket 186, hence the shaft 184, hence the sprocket 178 and up and down movement of the pushers 126 and 128.

In a typical cubing operation employing the apparatus depicted in the accompanying drawings, a plurality of blocks 32, usually in groups of two with their longitudinal dimensions parallel, are fed to the infeed station 34 by means of the roller conveyor 30 from which they are pushed onto the infeed table 36. As noted hereinbefore, six blocks, two rows of three each, with their ends in abutting relationship and with their longitudinal dimensions parallel to one another constitute a "load" on the infeed table 36. When this number of blocks, or another selected number of blocks is loaded onto the infeed table the load is sensed as by a detector (not shown). Thereupon, a signal is generated to activate the piston-cylinder device 192 to extend the piston 190 thereof, allowing the sprocket 180 to rotate in a counterclockwise direction as viewed in FIG. 7, thereby lowering the pushers 126 and 128 to a location just above the infeed table 36 and behind the blocks on the table 36 (pusher 126) and above the apron 38 (pusher 128). Upon the pushers 126 and 128 reaching their positions adjacent the infeed table and apron, a signal is generated, as by a microswitch or the like, to activate motor 156 which in turn drives the chains 144 and 146 to move the trolley 138 in a forward direction, i.e. to the left as viewed in FIG. 7. This action causes the pusher 126 to contact the blocks 32 on the infeed table and push the same forwardly onto the tables 42, 44, and 46 in the orientation station 40. This same action causes the pusher 128 to push any blocks then on the tables 42, 44 and 46 off such tables into the offloading station. Arrival of the blocks in the orientation station is sensed as by a photodetector or the like (not shown) to generate a signal which stops the forward movement of the pushers and activates the motor 84 (FIG. 10) to rotate the crank arm 92. This action results in rotation of the arm 100 and connecting rods 104 and 108 which are connected to the carriages 54 and 56, causing these carriages, with their portions of the block disposed thereon (normally two blocks per table), to be moved laterally along the tracks 58 in a direction away from the remaining blocks disposed on table 44. Because of the contiguity of the blocks on the tables 42, 44 and 46, the blocks can not be reoriented. In accordance with the present invention, the outboard tables 42 and 46 are moved laterally away from the central table 44 to provide adequate space for the desired reorientation of the blocks.

Further, the contiguity of the edges of the tables 42, 44 and 46 to the aprons 38 and 114 in their common horizontal plane prevents rotation of the tables. Therefore, in the present invention, there are provided the aprons 38 and 114, each being hingedly supported to the infeed table 36 and off-loading conveyor 112, respectively, so that each apron can be lowered for accommodating the rotation of the tables. In the depicted embodiment, the outboard edges of the apron are provided with respective cam surfaces 192 and 194 which engage rollers 196 and 198 that are mounted on the carriage 56 such that as the carriage 56 moves laterally outwardly from the table 144, the aprons 38 and 114 swing downwardly by gravity to provide clearance for the rotation of the tables. Return of the carriage 56 toward the table 44 causes the rollers 196 and 198 to raise the aprons to their horizontal positions.

As the tables 42 and 46 with their block burdens are moved laterally, the shoulders 62 and 74 of the tables 42 and 46, respectively, contact the cams 70 and 72 to cause rotation of the tables 42 and 46 by 90 degrees as the crank arm completes 180 degrees of rotation. Simultaneously, table 44 is rotated by reason of the shoulder 82 on the underside thereof contacting cam 80 as the cam is moved relative to the table by reason of the lateral motion of the carriage 56 (See FIGS. 10 and 11).

When the crank arm 92 has completed 180 degrees of rotation, further rotation of the crank arm changes the direction of rotation of the arm 100 to cause the carriages 54 and 56 to return to their original positions contiguous to the table 44. This contiguous position is achieved when the crank arm 92 has completed 360 degrees of rotation from its original starting position. In the course of this 360 degree rotation of the crank arm 92, the tables 42, 44 and 46 are rotated 90 degrees each so that the blocks on each table have had their respective longitudinal dimensions rotated 90 degrees. It is to be recognized at this point, that less than two blocks can be moved onto the tables 42, 44 and 46 by programming the extent of forward movement of the pusher 126 such that only one block (or one course of block) is moved into the orientation station 40 for reorientation thereof. Such programming of the movement of the pusher is conventional and will be understood by a person skilled in the art, given the present disclosure.

Once the pusher 128 has moved the reoriented blocks out of the orientation station onto the apron 114 in the off-loading station, the piston-cylinder device 192 is activated to raise the pushers 126 and 128, and the motor 166 is also activated to move the trolley 138 to the right as view in FIG. 7, whereupon the pushers 126 and 128 are lowered to commence a further cycling thereof. It will be noted at this point in the operation that the pusher 128 is lowered into position behind the reoriented blocks on the tables 42, 44 and 46 so that subsequent cycling of the pushers causes the pusher 128 to move the reoriented blocks through the off-loading station into the cubing station. Repeated cycling of the pushers 126, 128 moves successive groups of blocks out of the infeed station through the orientation station, through the off-loading station, from whence they are pushed into the cubing station. As noted above, it will be recognized by a person skilled in the art that the cycling of the pushers 126 and 128 is programmable as desired to reoriented selected ones of the blocks for introduction to the cubing station.

Within the cubing station, the oriented blocks are received on an elevator platform 116 from which they are moved as layers into a cube in a conventional manner. The completed cube is pushed from the cubing station to be transferred to storage or other site.

The controls for activating the various elements of the apparatus are conventional and need not be described in detail. Further, it will be clear to a person skilled in the art that the sequencing of the functioning of the apparatus may be chosen as desired to reorient less that a maximum of the blocks which can be held in the orientation station, even to the movement of a groups of blocks through the orientation station with no reorientation thereof.

While a preferred embodiment has been shown and described, it will be understood that there is no intent to limit the invention by such disclosure, but rather, it is intended to cover all modifications and alternate constructions falling within the spirit and scope of the invention as defined in the appended claims.

What is claimed is:

1. Apparatus for the reorientation of substantially rectangular units, each having a longitudinal dimension, comprising an orientation station including a plurality of table members, each having a substantially planar upper surface for receiving individual ones of said units, each of said tables being mounted for rotation thereof within its horizontal plane, means for moving selected ones of said tables laterally in a substantially horizontal plane away from the other of said tables in said orientation station and returning said rotated tables to their original position contiguous to said remaining tables in said orientation station, and means rotating selected ones of said tables in the course of their aforesaid lateral movement.

2. The apparatus of claim 1 wherein said orientation station includes three tables, each of which is individually rotatable within a substantially horizontal plane, a first one of said tables being movable laterally within said horizontal plane away from a central one of said tables, and a second one of said tables being movable laterally within said horizontal plane away from said central one of said tables, said first and second ones of said tables further being movable along divergent paths relative to one another when they are moving away from said central one of said tables.

3. The apparatus of claim 2 wherein said means moving said first and second tables comprises a crank arm and connecting rod means connecting said crank arm to said first and second tables for reciprocatory movement of said tables upon rotation of said crank arm means.

4. The apparatus of claim 2 wherein each of said tables includes shoulder means disposed on the underside thereof, and said means for moving selected ones of said tables laterally comprises cam means rigidly mounted for engagement with respective ones of said shoulder means, whereby contact of said shoulder means of one table with one of said cam means results in rotation of said table by approximately 90 degrees during a single reciprocatory cycle of movement of said table.

5. The apparatus of claim 4 and including arm means secured to one of said laterally movable tables and extending therefrom to a location beneath the underside of said central table, cam means disposed on said arm means, shoulder means disposed on the underside of said central table and in position to contact said cam means whereby lateral movement of said first table moves said cam means into contact with shoulder means on said central table to rotate said central table approximately 90 degrees in the course of a single reciprocatory cycle movement of said first table.

6. The apparatus of claim 1 including an infeed station and an unloading station, means moving said units from said infeed station into said orientation station, and from said orientation station to said unloading station, said means including first and second pusher means, arm means mounting said pusher means for substantially vertical movement thereof and means for moving said pushers along a substantially horizontal path in a cyclical motion.

7. In a method for orienting substantially rectangular units for accumulation in a cube or the like comprising the steps of moving a plurality of said units with their respective longitudinal dimensions parallel one to another into an orientation station, moving a first portion of said units in a substantially horizontal plane from the remaining units of said orientations, moving a second portion of said units laterally in a horizontal plane in a direction opposite from said first portion of said units and from the remainder of said units in said orientation station, while maintaining said remainder of said units stationary against lateral movement thereof, reorienting the longitudinal dimensions of all said units while said first and second portions are non-contiguous to said remainder of said units in said laterally extended positions, moving said first and second portions of said units laterally in a horizontal plane to their original position contiguous to said remaining units in said orientation station, and thereafter moving said units from said orientation station and accumulating the same in a cube or the like.

* * * * *